（12）United States Patent
De Leener et al.

(10) Patent No.: US 11,968,929 B2
(45) Date of Patent: Apr. 30, 2024

(54) AGRICULTURAL SYSTEM

(71) Applicant: CNH Industrial America LLC, New Holland, PA (US)

(72) Inventors: Kenneth De Leener, Oostkamp (BE); Niklaas G C Monteyne, Blankenberge (BE); Frederik Demon, Bruges (BE); Xavier G J M Bonte, Zuidzande (NL)

(73) Assignee: CNH Industrial America LLC, New Holland, PA (US)

( * ) Notice: Subject to any disclaimer, the term of this patent is extended or adjusted under 35 U.S.C. 154(b) by 785 days.

(21) Appl. No.: 17/092,884

(22) Filed: Nov. 9, 2020

(65) Prior Publication Data
US 2021/0137018 A1 May 13, 2021

(30) Foreign Application Priority Data

Nov. 8, 2019 (EP) .................................. 19208201

(51) Int. Cl.
*A01F 15/08* (2006.01)
*A01F 15/04* (2006.01)

(52) U.S. Cl.
CPC ........ *A01F 15/0841* (2013.01); *A01F 15/042* (2013.01)

(58) Field of Classification Search
CPC ........................... A01F 15/0841; A01F 15/085
See application file for complete search history.

(56) References Cited

U.S. PATENT DOCUMENTS

| | | | | |
|---|---|---|---|---|
| 7,727,114 | B2* | 6/2010 | Tarasinski | A01F 15/085 477/110 |
| 8,113,114 | B2* | 2/2012 | Schlesser | A01D 41/1274 56/16.4 B |
| 8,973,493 | B2* | 3/2015 | O'Reilly | A01F 15/0841 100/280 |
| 9,585,297 | B2* | 3/2017 | Bonte | A01B 61/025 |
| 10,806,092 | B2* | 10/2020 | Thies | A01F 15/10 |
| 2014/0137757 | A1 | 5/2014 | Nelson et al. | |
| 2020/0271170 | A1* | 8/2020 | Tacke | F16D 31/00 |

FOREIGN PATENT DOCUMENTS

EP 3398427 A1 11/2018

OTHER PUBLICATIONS

Extended European Search Report for EP application 19208201.4, dated Apr. 3, 2020 (7 pages).

* cited by examiner

*Primary Examiner* — Matthew Katcoff
(74) *Attorney, Agent, or Firm* — Peter K. Zacharias

(57) ABSTRACT

An agricultural system including an agricultural baler and a control unit. The agricultural baler includes a baler driveline; a rotatable flywheel; and a rotary input shaft connected by way of the baler driveline to the rotatable flywheel. The driveline includes one or more clutches for controllably transferring rotary drive between the input shaft and the flywheel. The control unit is configured to receive input-power-data indicative of a drive power available at the rotary input shaft; and determine a clutch-control-signal for controlling an amount of torque transferred from the input shaft to the flywheel bye the one or more clutches, based on the input-power-data.

15 Claims, 6 Drawing Sheets

AGRICULTURAL SYSTEM

FIELD OF THE INVENTION

The invention relates to an agricultural system that includes agricultural baler machine, particularly but not exclusively, to a baler implement. Other aspects of the present invention relate to a method of controlling an agricultural baler.

BACKGROUND OF THE INVENTION

Baling machines are well known in agriculture and are widely used to bale plant matter in fields into bales that may be conveniently and effectively handled, stored and used. Baling machines are known that bale forage products such as grass and other leaves used as hay or other types of animal feed; straw or other plant parts resulting as by-products from a harvesting operation such as combine harvesting; cotton; and other plant parts of commercial or other value.

The majority of baling machines in use in Europe are designed to be towed behind an agricultural tractor or another towing vehicle that, under the control of an operator and/or using operator-monitored software, moves the baling machine about a field and provides power to operate internal parts of the baling machine. The provision of power is effected by way of a rotatable power take-off (PTO) shaft connected to the rotary power take-off that typically is part of the tractor.

Known designs of agricultural baling machine include a pick-up, mounted at the front of the machine, that causes the ingestion of plant matter into the interior of the machine as it moves about a field. Differing internal designs of baler components are known in the part of the machine downstream of the pick-up.

One commonplace type of baling machine is often referred to as a "rectangular baler". This includes a cuboidal bale-forming chamber in which the ingested plant matter is compacted into a cuboidal shape by a piston or plunger that reciprocates longitudinally back and forth inside the bale-forming chamber between retracted and extended positions. Charges of plant matter repeatedly are fed into the bale-forming chamber from the pick-up by the mechanism of the baling machine. This action is timed with the motion of the plunger such that feeding of plant matter coincides with retraction of the plunger to one end of the bale-forming chamber. The plant matter then is compacted by subsequent extension strokes of the plunger along the bale-forming chamber.

The reciprocal rectilinear motion of the plunger is effected using a driveline that converts rotary drive derived from the rotating PTO shaft, connected to the baling machine above the pick-up, into reciprocal motion of the plunger. This typically is achieved by changing, in the driveline, the axis of the rotation from one parallel to the longitudinal length of the baling machine to an axis of rotation transverse thereto.

Such transverse-axis rotation is applied to a crank that is pivot-jointed to one end of a conrod the other end of which is pivot-jointed to the plunger, that is moveably captive inside the bale-forming chamber. As a result, rotation of the crank causes the reciprocal movement of the plunger.

The driveline between the power take-off of the tractor and the plunger includes a clutch that in a typical case is formed of two or more dry friction plates that are urged into mutual engagement by a hydraulic actuator or spring arrangement. Additionally a heavy flywheel (that in some baling machine designs weighs 600 kg or more) is secured to a rotatable shaft that defines or is connected to an input shaft in turn connected in use to the PTO shaft.

The flywheel is needed because the plunger during its motion is associated with very high, and highly varying, levels of power that might peak at 1500 Hp (about 1100 kW). In the absence of the flywheel it might be impossible for the rotary power take-off of a tractor to provide sufficient power to move the plunger, and very high forces might be transmitted back towards the tractor via the PTO shaft potentially causing damage to the baling machine or tractor or making the tractor-baling machine combination difficult to control.

The flywheel and the plunger present a system having a high level of inertia and, in some cases, mechanical resistance (especially when the driveline is at rest or is moving slowly). The inertia and mechanical resistance can be increased by factors such as:

The at-rest plunger position causing an unfavourable conrod transmission angle with the consequence that plunger movement is difficult to initiate;

Plant matter in the bale-forming chamber resisting movement of the plunger; and/or Larger, less compressible items, such as tree branches, litter and stones, impeding movement of the plunger in the bale-forming chamber.

Often the output power of the tractor that is connected to tow and power the baling machine is poorly matched to the energy requirements of such a system. Furthermore, the power output of the tractor will likely not be accurately known. The tractor power can be an unknown/uncertain factor due to one or more of the following reasons: (i) the advertised power deviates from what its actually capable of delivering; and (ii) the torque an engine is able to deliver depends on its engine speed according to a torque curve—this curve is typically not known by the user. Tractor power can also depend on the temperature of the tractor engine. For example, if the baler is started up at the beginning of a day the temperature of the engine may be significantly less than when the engine is at temperature. Such factors lead to numerous practical problems.

In such a situation the energy of the PTO shaft may be insufficient to cause either movement of the plunger or slipping of the baling machine driveline clutch, with the result that on engagement of the power take-off the engine of the tractor stalls. This may cause damage to the power take-off components or in some cases the engine of the tractor. Even if these outcomes do not occur, the inevitable interruptions in the baling activity are undesirable because of their adverse effect on bale quality and integrity and the wasting of commercially valuable plant matter.

In view of the above, it will be appreciated that there is a need for improved balers and a method of controlling such a baler that will solve or ameliorate one or more problems of prior art baling machines.

The terms "baling machine" and "baler" are used synonymously herein and in the art generally.

The term "power take-off" is synonymous with the acronym "PTO".

The term "tractor" embraces a wide variety of work vehicles potentially capable of towing a baling machine, as will be known to the person of skill in the art.

The term "clutch" except as otherwise explained embraces any design of clutch that is suitable for transferring drive in the circumstances described.

The term "plant matter" and derivatives potentially includes all types of matter that potentially may be ingested into a baling machine for the purpose of being formed into bales.

The terms "piston" and "plunger" in the context of the principal, moveable, bale-forming part of a bale-forming chamber are used synonymously herein.

SUMMARY OF THE INVENTION

Aspects and embodiments of the disclosure provide an agricultural baler and a method for controlling an agricultural baler as claimed in the appended claims.

According to a first aspect, there is provided an agricultural system comprising:
  an agricultural baler, comprising a rotary input shaft connected by way of a baler driveline to a rotatable flywheel, the driveline including one or more clutches for controllably transferring rotary drive between the input shaft and the flywheel; and
  a control unit that is configured to:
    receive input-power-data indicative of a drive power available at the rotary input shaft; and
    determine a clutch-control-signal for controlling an amount of torque transferred from the input shaft to the flywheel via the one or more clutches, on the basis of the input-power-data.

Advantageously, such an arrangement can result in the flywheel being brought up to an operating speed in a more time and energy efficient way for a plurality of different types and power levels of tractor engine. Therefore, an improved start-up of the baler can be achieved.

The control unit may be configured to determine the clutch-control-signal for gradual increase of the amount of torque transferred to the flywheel.

The input-power-data may comprise measured-input-power-data that represents measurements of one or more operating parameters of the agricultural system or an associated tractor. The control unit may be configured to: determine an error-factor that is an indicator that one or more of the measurements has dropped below an expected value, and determine the clutch-control-signal for decreasing the rate at which torque is transferred to the flywheel via the one or more clutches based on the error-factor.

The measured-input-power-data may represent a measurement of a rotational speed of the rotary input shaft. The control unit may be configured to: determine an error-value that is an indicator that rotational speed of the rotary input shaft has exceeded an error-value-threshold; and determine the clutch-control-signal based on the error-value in order to decrease the rate at which torque is transferred to the flywheel via the one or more clutches.

The measured-input-power-data may represent a measurement of a rotational speed of the rotary input shaft. The control unit may be configured to: determine a derivative-value that is an indicator that the rate of change of the rotational speed of the rotary input shaft with respect to time has exceeded a derivative-value-threshold; and determine the clutch-control-signal based on the derivative-value in order to decrease the rate at which of torque is transferred to the flywheel via the one or more clutches.

The control unit may be configured to determine a clutch-control-signal for decreasing the rate at which of torque is transferred to the flywheel via the one or more clutches until the error-value has dropped below the error-value threshold and/or until the derivate-value has dropped below the derivate-value-threshold.

The input-power-data may comprise predefined-input-power-data. The control unit may be configured to determine the clutch-control-signal as one of a plurality of predetermined target-control-profiles on the basis of the predefined-input-power-data. Each of the plurality of predetermined target-control-profiles may be configured to increase the amount of torque transferred to the flywheel at a different rate.

The plurality of predetermined target-control-profiles may include a high-responsive target-control-profile and a low-responsive target-control-profile. The high-responsive target-control-profile may be configured to increase the amount of torque transferred to the flywheel faster than the low-responsive target-control-profile.

The predefined-input-power-data may be indicative of a responsiveness of an engine driving the rotary input shaft. The control-unit may be configured to select one of the plurality of predetermined target-control-profiles on the basis of the responsiveness of the engine.

The predefined-input-power-data may be provided by an operator. The control-unit may be configured to select a high-responsive target-control-profile if the operator does not provide the input-power-data before the rotational speed of the rotary input shaft exceeds a set speed-threshold.

The control unit may be configured to store a transcript of the clutch-control-signal as prior-clutch-control-data for future use.

The driveline may include a transmission including driveline components defining at least first and second selectable transmission ratios between the input shaft and the flywheel. The one or more clutches being capable of selectively engaging the first or second transmission ratios. The control unit may be configured to determine a clutch-control-signal applicable to selectively engage driveline components defining the first transmission ratio during start-up of the agricultural baler.

The control unit may be configured to determine a clutch-control-signal applicable to selectively engage driveline components defining the second transmission ratio, if the one or more clutches are fully engaged, when the transmission operates at the first transmission ratio, and the rotational speed of the rotary input shaft remains above a set speed-threshold for a predetermined amount of time.

The one or more clutches may be friction clutches. The clutch-control-signal may be applicable to set a pressure applied to engage friction surfaces of the one or more clutches.

According to a further aspect, there is disclosed a computer-implemented method for controlling an agricultural baler, said baler comprising a rotary input shaft connected by way of a baler driveline to a rotatable flywheel, the driveline including one or more clutches for controllably transferring rotary drive between the input shaft and the flywheel,
  wherein the method comprises:
    receiving input-power-data indicative of a drive power available at the rotary input shaft; and
    determining a clutch-control-signal for controlling an amount of torque transferred from the input shaft to the flywheel via the one or more clutches, on the basis of the input-power-data.

According to another aspect of the present disclosure, there is provided an agricultural machinery comprising the any agricultural baler disclosed herein (e.g. a baler implement), a control unit and an agricultural vehicle for transporting the agricultural baler implement. There may be provided a computer program, which when run on a computer, causes the computer to configure any apparatus, including a control unit, disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

The agricultural work vehicle (or tractor) may include one or more control devices, such as but not limited to programmable or non-programmable processors. Similarly, the baler implement may include one or more control devices, such as but not limited to programmable or non-programmable processors. Additionally, or alternatively, the baler implement may be controlled by one or more control devices of the agricultural work vehicle. Similarly, the agricultural work vehicle may be controlled by one or more control devices of the baler implement.

The agricultural work vehicle and/or the baler implement may be remote controlled, e.g. from a farm office. Accordingly, the agricultural work vehicle may include one or more communication interfaces for connection to a remote processor and/or a remote controller. Similarly, the baler implement may include one or more communication interfaces for connection to a remote processor and/or a remote controller.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE DRAWINGS

Figure 1:
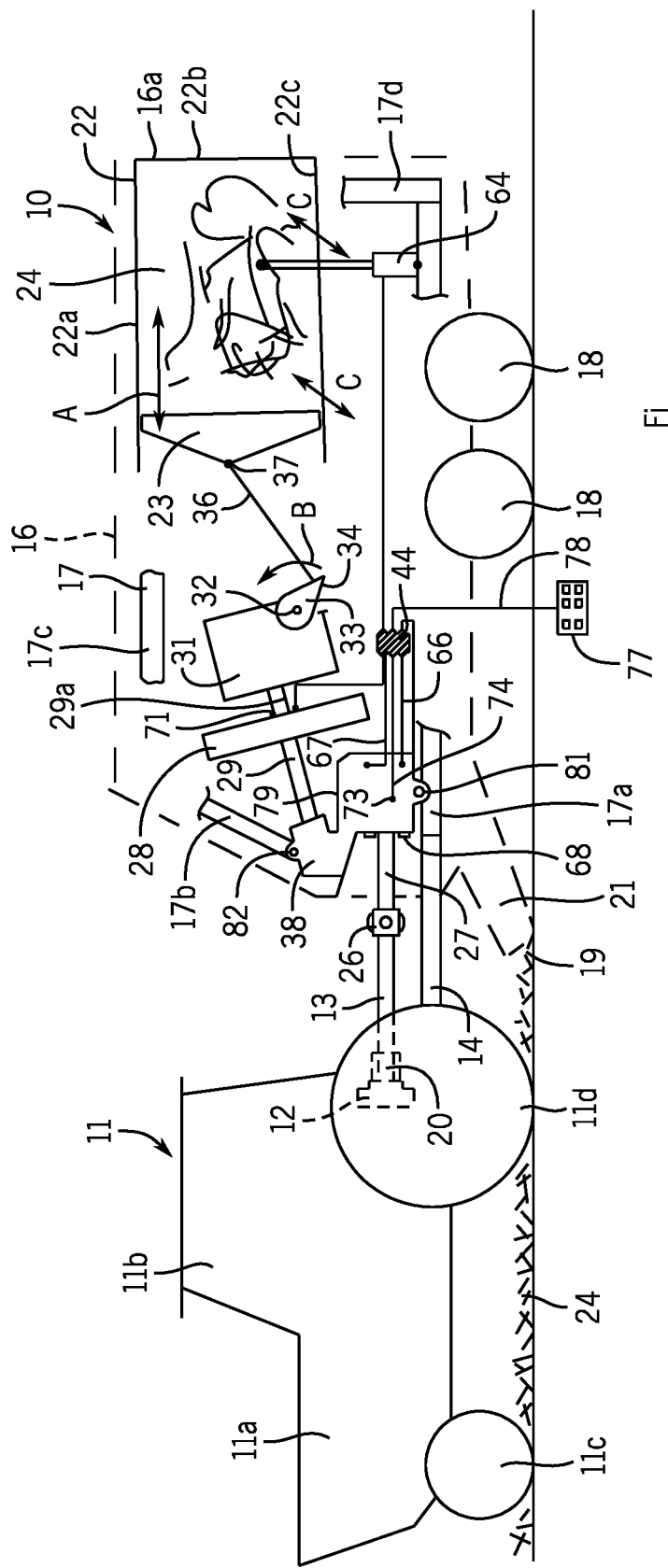
FIG. 1 is a schematic representation of an agricultural baling machinery comprising a baler implement and a work vehicle.

Referring to the drawings a baling machine 10 is shown being towed behind an agricultural work vehicle (towing vehicle) that in the illustrated embodiment non-limitingly is an agricultural tractor 11.

The tractor 11 is a conventional tractor including a vehicle frame/body 11a, rear-mounted cab 11b, front, steerable, ground-engaging wheels 11c and rear, driven, ground-engaging wheels 11d. Tractor 11 includes at its rear end between the rear wheels 11d a power take-off 12 of a conventional design that includes a rotative coupling for a PTO shaft 13 that extends rearwardly of the tractor 11. The PTO 12 may be engaged to cause rotation of the PTO shaft 13 or disengaged, such that the shaft 13 is not powered to rotate, for example through the operation of a control lever or pushbutton.

The tractor 11 may have any of a range of engine power outputs including but not limited to 200 hp, 300 hp and 400 hp. The baling machine 10 is operable when towed by any such tractor 11, without a need for adjustment or modification, for the reasons explained below.

The PTO shaft 13 may be any of a variety of lengths. A relatively short PTO shaft 13 and drawbar 14 (described below) minimises the distance between the pick-up 19 (described below) of the baling machine 10 and the tractor 10. This provides certain advantages, although in some other respects a longer PTO shaft 13 may provide good adjustment flexibility.

The partial driveline represented by the PTO 12 and PTO shaft 13 may in various types of tractor include a PTO clutch 20 that as described above seeks to protect the engine of the tractor 11 from damage caused e.g. when an excessive loading on the PTO shaft causes engine stalling. The PTO clutch 20 is shown schematically in FIG. 1. It may readily be envisaged by the person of skill in the art and typically would be a one-way clutch of a kind that permits free movement when rotating in one direction, and transfers rotary drive via the PTO shaft 13 when rotating in the opposite direction. Other forms and locations are possible in respect of the clutch 20.

The baling machine 10, i.e. a baling implement, is secured to the rear of the tractor 11 by way of a drawbar 14 that typically is of an "A"-shape when viewed in plan and extends forwardly of the baling machine 10 below the PTO shaft 13. The drawbar 14 is pivotably secured to a conventional towing hitch at the rear of the tractor 11.

The baling machine 10 includes a housing or cover 16 that may take a variety of forms. The housing 16 in most baling machine designs includes a section 16a that is open to permit ejection of formed bales at the rear of the baling machine 10.

Panels defining the housing 16 further may be openable or removable in order to permit maintenance of the interior parts of the baling machine 10 replacement of bobbins of twine used for tying completed bales or the clearance of blockages that can arise for a variety of reasons.

The housing 16 of the baling machine 10 is secured to a baling machine frame 17 selected parts 17a, 17b, 17c, 17d of which are illustrated in FIG. 1, with the complete frame 17 being omitted for ease of illustration.

The baling machine 10 is mobile and to this end it includes secured to the frame 17 two or more ground-engaging wheels 18.

In the embodiment illustrated, four wheels are provided, being left and right front wheels and left and right rear wheels 18. In FIG. 1 the left-hand side front and rear wheels are visible.

In this regard the front or forward end of the baling machine 10 is the end of it that is closest to the towing tractor 11, and the terms "rear", "left", "right", "upper", "lower" and derivative terms are interpreted accordingly and as though an observer is looking forwardly along the baling machine 10.

The wheels 18 may be mounted relative to the frame 17 by way of suspension components and passive or active steering components as would be known to the person of skill in the art, or they may be mounted more simply. The wheels 18 optionally may include tyres and/or gripping elements that are omitted from FIG. 1 for ease of viewing.

A pick-up 19 projects forwardly of the baling machine 10 and is arranged to collect cut plant matter 24 lying in a field in which the baling machine 10 moves as influenced by the motion of the tractor 11. The pick-up 19 passes the plant matter to a conveyor 21. The conveyor 21 conveys the plant matter inside the baling machine 10 where it undergoes baling.

Numerous designs of pick-up 19 and conveyor 21 are known in the baling machine art and fall within the scope of embodiments disclosed herein. The precise designs of the pick-up 19 and conveyor 21 are essentially immaterial to the nature and operation of the invention, and therefore are not described in detail.

As mentioned, the baling machine 10 includes an internal bale-forming chamber 22. This is an elongate, cuboidal volume defined by chamber walls of which top and bottom walls 22a and 22c are visible in FIG. 1. The bale-forming chamber 22 in a typical baling machine design extends in a fore and aft direction in an upper part of the rear of the volume enclosed by the housing 16.

The rear 22b of the bale-forming chamber coincides with the aforementioned open housing section 16a in order to allow ejection of completed bales in a per se known manner.

A crop flow path exists inside the baling machine 10 between the conveyor 21 and the bale-forming chamber 22. The crop flow path may readily be envisaged and is omitted from the figures for clarity.

The forwardmost end of the bale-forming chamber 22 is essentially open. A plunger 23 occupies the interior cross-section of the bale-forming chamber 22 and is constrained to move longitudinally inside the chamber 22 from the open, forward end towards and away from the rear 22b of the bale-forming chamber 22 as signified by arrow A.

The PTO shaft 13 as mentioned may be powered to rotate, in virtually all tractors in a clockwise direction when viewed from behind the tractor 11. PTO shaft 13 is connected by way of at least one, and in practice at least two, universal joint 26 to the forwardmost end of a rotary input shaft 27 of the baling machine 10. The universal joint 26 in a well-known manner accommodates changes in the relative orientation of the tractor 11 and baling machine 10 that result from towing of the baling machine from place to place, e.g. while the baler is working or when it is travelling between fields.

The input shaft 27 is supported e.g. using journal bearings that are omitted from FIG. 1 for ease of viewing and connects by way of a driveline, described in more detail below, to a rotatable flywheel 28.

Flywheel 28 is supported on a flywheel shaft 29 that also is supported using journal bearings, or a functionally similar arrangement, that further is omitted from FIG. 1. The functions of the flywheel 28 are as described above, although as explained it is possible for the flywheel 28 in embodiments of the invention to be made considerably lighter than some prior art flywheels.

The rear end 29a of the flywheel shaft 29 is a rotary input to a drive converter 31 or similar transmission that by way of intermeshing gear components alters the axis of rotation of rotative energy in the baling machine 10. This drive converter 31 may be referred to as a main transmission in some examples.

The nature of the drive converter 31 thus is such that the longitudinally extending (with reference to the elongate length of the baling machine 10 as illustrated) axis of rotation of the flywheel shaft 29 becomes rotation about a transversely extending axis of a crankshaft 32.

The crankshaft 32 is connected to a pair of crank members (only the right one is shown as 33) that protrude from the drive converter 31 in a manner presenting free ends. The pair of crank members and corresponding conrods (only the right one shown as 36) connect the crankshaft 32 of the drive converter 31 with the forward side of the plunger 23. A first, right side crank member 33 has a first end connected to the crankshaft 32 of the drive converter 31. A second end of the first, right side crank member 33 is connected to a first end 34 of a first, right side conrod 36. The first, right side conrod 36 has a second end 37 connected to the plunger 23. A second, left side crank member (not shown) has a first end connected to the crankshaft 32 of the drive converter 31. A second end of the second, left side crank member is connected to a first end of a second, left side conrod (not shown). The second, left side conrod has a second end (not shown) connected to the plunger 23.

As is apparent from FIG. 1, therefore, rotation of crankshaft 32 causes rotation of crank member 33, as signified by arrow B, that gives rise to the rectilinear, reciprocal motion of plunger 23 indicated by arrow A.

In this regard it is somewhat arbitrary whether crank 33 rotates clockwise or anti-clockwise, since reciprocal motion of the plunger 23 may in an appropriately designed set of driveline elements be achieved regardless of the direction of rotation of the crank 33. The actual rotational direction of the crank 33 would be a consequence of the internal design of the drive converter 31. Such aspects are not relevant to an understanding of the invention, and therefore are not provided in detail herein.

Charges of plant matter 24 conveyed inside the baling machine 10 from the conveyor 21 repeatedly are at intervals fed by internal components of the baling machine 10, that are omitted from FIG. 1 for clarity, into the interior of the bale-forming chamber 22 for compaction by reason of the reciprocal, rectilinear motion (arrow A) of the plunger 23. The feeding of each charge of plant matter 24 is timed to coincide with positioning of the plunger 23 at its retracted, i.e. forwardmost position, with the result that the plant matter 24 becomes compressed and compacted by the movement of the plunger 23 into bale form after it has been fed in to the bale-forming chamber 22.

The driveline defined between the input shaft 27 and the flywheel shaft 29 includes a transmission 38 that is described below in relation to FIGS. 2 and 3.

Figure 2:
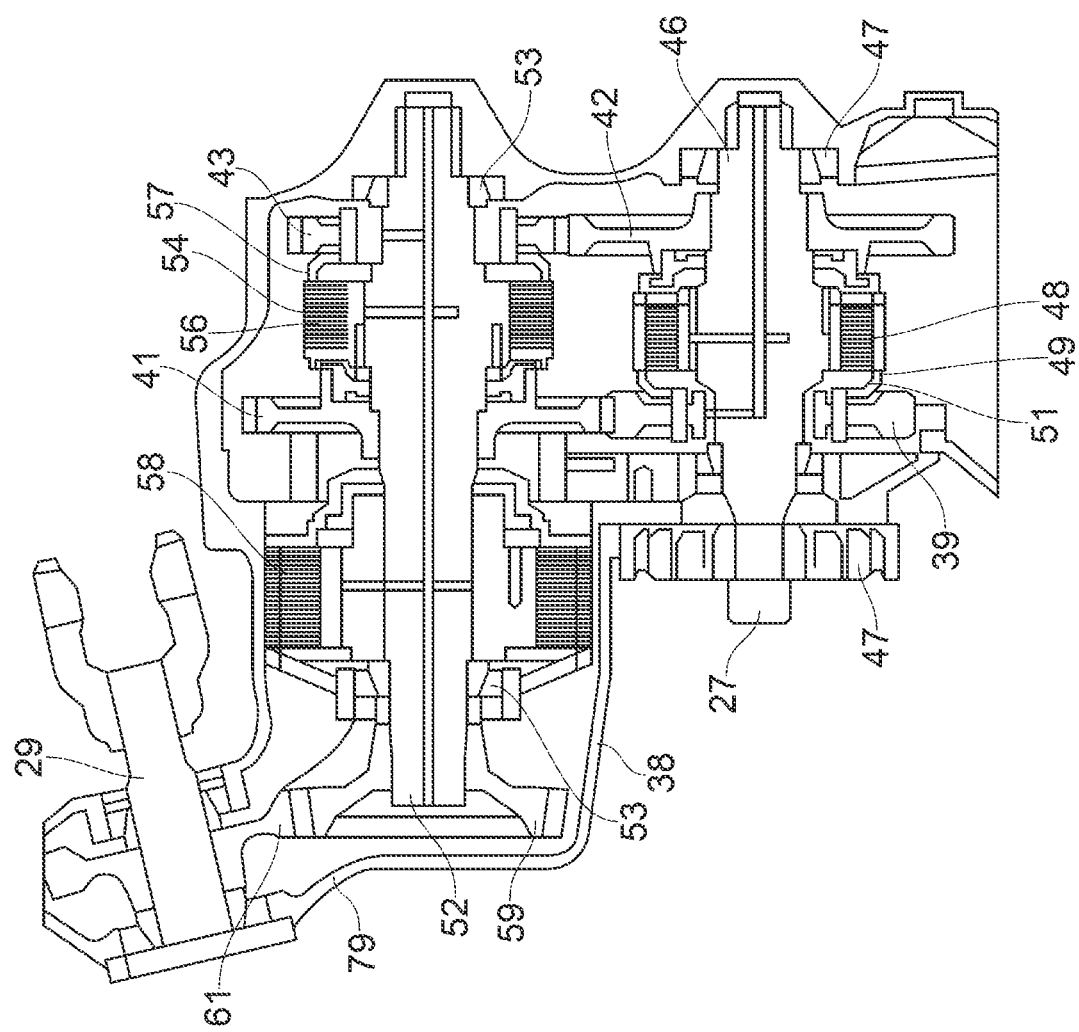
FIG. 2 is a cross-sectional view of a transmission, forming part of the baling machine visible in FIG. 1.
Figure 3:
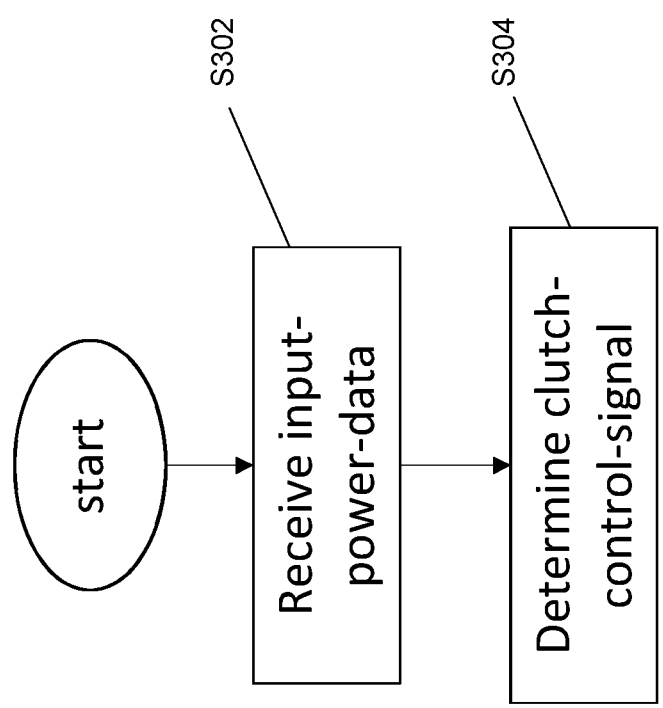
FIG. 3 is a schematic flow chart of the method for controlling an agricultural baler according to an embodiment of the present disclosure.

In FIGS. 2 and 3 the transmission 38 connects the rotary input shaft 27 to the flywheel shaft 29 at first and second selectable transmission ratios defined by driveline components within the transmission 38.

A first transmission ratio is defined by mutually meshing, rotary, toothed gears 39, 41 that each are supported for rotation within the transmission 38. The first transmission ratio is a relatively great reduction ratio transmission providing a high degree of mechanical advantage.

A second transmission ratio is defined by mutually meshing, rotary, toothed gears 42, 43 that each are supported for rotation within the transmission 38 adjacent the gears 39, 41 in a manner defining a parallel driveline to that representing the first transmission ratio. The second transmission ratio is a relatively close reduction ratio transmission providing a higher speed of output shaft rotation than the first transmission ratio.

The baling machine 10 includes a control unit 44, non-limitingly illustrated schematically in FIG. 1, in the form of a programmable microprocessor. The baling machine 10 includes a source of electrical power, for the control unit 44, that in preferred embodiments may take the form of a rotary generator that is driven directly or indirectly by the PTO shaft, although other sources of electrical power including batteries and other storage devices, or other types of generator, are possible. Combinations of electrical power sources furthermore are possible.

As indicated, the control unit may take a variety of forms and need not be a control unit as illustrated, or a single component.

The control unit 44 is capable (typically but not necessarily as a result of software and/or firmware programming) of selectively engaging the first or the second transmission ratio. The arrangement of the components and/or the programming of the control unit 44 prevents the first and second transmission ratios from being selected simultaneously.

As best illustrated in FIGS. 2 and 3, the input shaft 27 rigidly connects to an input gear shaft 46 that is supported (non-limitingly in the embodiment illustrated by way of journal bearings 47 at either end) for rotational movement inside the transmission 38. The input gear shaft 46 is locked to the gear 42 such that the gear 42 always rotates with the input gear shaft 46.

The input gear shaft 46 is also locked to an input side 48 of first transmission clutch 49 forming part of the driveline. As a result the input side 48 of the first transmission clutch 49 also rotates with the input gear shaft 46.

The first transmission clutch 49 is e.g. electrically or electro-hydraulically activated in the described embodiment, and is selectively engageable under command from the control unit 44. When engaged the output side 51 of the first transmission clutch 49 is locked to the input side 48 and rotates therewith.

The output side 51 of first transmission clutch 49 is locked to the gear 39 of the first transmission ratio such that the gear 39 rotates with the output side 51.

In the illustrated embodiment the first transmission clutch 49 lies on the first gear shaft 46 intermediate the gears 39 and 42, but as will occur to the person of skill in the art this need not be the case, and other clutch and gear position combinations are possible.

As explained the gears 42 and 43 are mutually meshed, with the gear 43 supported on the rotational intermediate gear shaft 52. The intermediate gear shaft 52 is supported (in the non-limiting example shown by way of journal bearings 53 at either end) for rotation relative to the remainder of the transmission 38.

By reason of locking of the input gear shaft 46 to the gear 42, the gear 43 rotates whenever the input gear shaft 46 rotates, at a speed, relative to the speed of the input gear shaft 46, determined by the gear tooth ratio between the gears 42 and 43. However, the gear 43 merely idles unless a second transmission clutch 54, which may be of a similar design to the first transmission clutch 49 and hence operable under command of the control unit 44, is engaged.

In this respect, the intermediate gear shaft 52 is locked to an input side 56 of second transmission clutch 54; and an output side 57 is locked to the gear 43. As a result, when the clutch is engaged, rotation of gear 43 is transmitted via the intermediate gear shaft 52.

The gear 39 is meshed with the gear 41 as explained. The gear 41 is locked to the intermediate gear shaft 52. Clearly, therefore, to avoid locking up of the transmission it is essential that only one of the transmission clutches 49, 54 is engaged at a time. When the first transmission clutch 49 is engaged and the second transmission clutch 54 is disengaged, drive from the input shaft 27 is transmitted via the meshed gears 39 and 41 to drive intermediate gear shaft 52 in accordance with the first, reduction transmission ratio "G1" determined by the numbers of teeth of gears 39 and 41. At this time, the gears 42 and 43 rotate in an idling manner.

When the first transmission clutch 49 is disengaged and the second transmission clutch 54 is engaged, the drive of the input shaft 27 is transmitted via the gears 42 and 43 to the drive intermediate gear shaft 52 in accordance with the second transmission ratio "G2" determined by the numbers of teeth of the gears 42 and 43.

As explained herein, the first transmission ratio G1 is a reduction ratio in which the speed ratio exceeds 1. This provides a beneficial mechanical advantage when moving the flywheel 28 from rest. The second transmission ratio G2 is an accelerative ratio the speed ratio of which is a value less than 1. This causes rotation of the flywheel shaft 29 to be at a higher speed than that of the PTO shaft 13.

It is possible for both the clutches 49, 52 to be disengaged simultaneously. In that case gears 42 and 43 would rotate, but no drive would be transmitted to intermediate gear shaft 52.

The intermediate gear shaft 52 includes, mounted thereon, an optional brake 58 that may be employed when both the transmission clutches 49, 52 are disengaged to slow the flywheel shaft 29. The latter receives the rotary drive of intermediate gear shaft 52, when one of the transmission clutches 49, 54 is closed, via meshed output gears 59, 61.

The numbers of teeth of the gears 39, 41, 42, 43, 59 and 61 may be varied extensively in all the gears of the transmission 38 depending on the precise design of the transmission 38. The overall numbers of drive-transferring components in the transmission may be varied. Also as explained the driveline elements defining the transmission ratios need not be meshing, toothed gears and instead may adopt a range of other forms, including but not limited to the examples given above.

The transmission clutches 49 and 54 may be for example electrically (e.g. solenoid) operated, electro-mechanically operated or electro-hydraulically operated, under the control of the control unit 44. Preferably, but not essentially, the transmission clutches 49, 54 are spooled wet clutches the nature of which is familiar to the person of skill in the art and therefore does not require describing in detail herein. Wet clutches generally are highly suitable for computer or other electronic control, leading to rapid clutch engagement and disengagement.

One form of control of the transmission clutches 49, 54 is by electrical control signals transmitted from the control unit 44 to the first and second transmission clutches 49, 54. One form of control of the transmission clutches 49, 54 is illustrated schematically by electrical control signal line 66 (FIG. 1) that transmits commands from the control unit 44 to first transmission clutch 49; and control line 67 that transmits commands from the control unit 44 to second transmission clutch 54.

Two-way communication between the transmission clutches 49, 54 and the control unit 44 optionally is possible. Using two-way control, the transmission clutches 49, 54 can signify e.g. their operational (i.e. engaged or disengaged) status, information on the condition of wear parts such as friction plates, levels of clutch fluid in the event of the clutches being wet clutches as is preferred and similar operational variables. The control unit 44 can generate commands and/or warning signals in dependence on the signals received from the transmission clutches 49, 54.

The control unit 44 may further be connected to a rotational speed sensor 68 and/or an oil temperature sensor 73 via electric signal line 74.

The control unit 44 is capable of selectively disengaging the rotary drive between the input shaft 27 and the shaft 29 supporting the flywheel 28. This possibility is explained further below in connection with operational sequences made possible by the apparatus of the invention. The control unit 44 may also be capable of selectively activating the brake 58 of the transmission 38. Activation of the brake 58 will actively slow the rotational speed of the flywheel shaft 29 and thus the speed of the flywheel 28 connected to the flywheel shaft 28.

The baling machine 10 optionally may include one or more input devices 77, represented schematically and non-limitingly in FIG. 1, by means of which the operator may provide input-power-data, such as a maximum power output of the corresponding towing vehicle (tractor), to the control unit 44.

In FIG. 1 an input device 77 is shown in the form of a keypad connected to the control unit 44 via an electrical cable 78, and using which e.g. the rated power output of the tractor 11 can be input to the baling machine 10. As will be described in more detail below, the control unit 44 can determine a suitable clutch-control-signal that is optimised for the input power provided by the tractor.

The input device 77 may take a variety of other forms and may be provided anywhere on the baler 10 and/or the corresponding tractor 11. In some embodiments, the input device 77 may be provided remotely and in communication with receivers mounted on the tractor 11 or the baler 10. The input device 77 may include a code reader that can read a code printed or affixed on part of the tractor 11, e.g. adjacent the PTO; a near-field communications (NFC) device that establishes a communications link with a control unit forming part of the tractor 11 in order to download power output information; or a cable connection between the control unit 44 and a counterpart control unit forming part of the tractor 11.

The transmission 38 may include a rigid housing 79 that may be formed e.g. by casting from a metal alloy, especially a high stiffness, lightweight alloy.

As explained the baling machine 10 includes a number of frame elements 17. The housing 79 may be positioned to interconnect two or more such frame members (e.g. frame members 17a and 17b as non-limitingly illustrated in FIG. 1) in a manner enhancing the stiffness of the frame 17 of the baling machine 10.

In the illustrated embodiment such interconnection is achieved by way of perforated lugs 81, 82 by means of which the housing 79 is bolted to interconnect two frame members, but as will be apparent to the person of skill in the art such interconnection may be achieved in a variety of alternative ways.

The layout of the components of the transmission 38 inside the housing 79 is such that the driveline components 39, 41 defining the first transmission ratio occupy a first vertically extending distance in the housing 79; and the driveline components 42, 43 defining the second transmission ratio occupy a second vertically extending distance in the gearbox housing, the upper limit of the second vertically extending distance terminating below the upper limit of the first vertically extending distance.

This means that the transmission 38 is compact in the longitudinal dimension of the baling machine 10, and also that the output of the transmission 38 is connected to the flywheel shaft 29 at a relatively high point in the baling machine 10. This provides several advantages in terms of transferring drive input via the input shaft 27 to the location of the plunger 23, which as mentioned is located relatively high inside the baling machine 10.

Turning to FIG. 3, there is shown a schematic flow chart of a method for controlling an agricultural baler according to an embodiment of the present disclosure. The method of FIG. 3 may be employed by a control unit, such as the control unit 44 described with reference to FIG. 1 above, in order to control an agricultural baler as also shown in FIG. 1, for example. The method may be used during start-up of the agricultural baler, that is when power is initially transferred from the PTO of the tractor to an input shaft of the baler. In some embodiments, this may be triggered by a start of the tractor engine. An agricultural baler that may suitably be controlled by the method shown in FIG. 3 may include a rotary input shaft connected by way of a baler driveline to a rotatable flywheel, the driveline including one or more clutches, such as the first and second clutches 49, 54 described above, for controllably transferring rotary drive power between the input shaft and the flywheel.

In a first step S302, the method 100 shown in FIG. 3 comprises a step for receiving input-power-data. The input-power-data is indicative of a drive power available at the rotary input shaft, such as the input shaft 27 shown in FIG. 1. It will be appreciated that the drive power available at the rotary input shaft is directly dependent on the drive power of the tractor PTO shaft, which, in turn, is driven by the engine of the tractor. As will be discussed in detail below, in some examples the input-power-data can include predefined-input-power-data that is received in response to input being provided by an operator of the baler. Additionally or alternatively, the input-power-data can include measured-input-power-data. The measured-input-power-data can represent measurements of one or more operating parameters of the baler and/or the tractor that are indicative of a drive power available at the rotary input shaft, and optionally whether or not that drive power is sufficient. As discussed below, the one or more operating parameters can include the rotary input shaft speed, the PTO shaft speed, and/or the tractor engine output power. For instance, if the measured-input-power-data represents a measurement of a rotational speed of the rotary input shaft or the PTO shaft, then this does not represent the absolute amount of drive power that is available at the rotary input shaft. However it does represent whether or not the drive power is sufficient, as will be discussed in more detail below. Therefore, the measured-input-power-data can still be indicative of a drive power available at the rotary input shaft—i.e. there is either sufficient drive power available or there is insufficient.

On the basis of the input-power-data provided in step S302, the method determines a clutch-control-signal in a second step S304 for controlling an amount of torque transferred from the input shaft to the flywheel via the one or more clutches. The "clutch-control-signals" may be any signal created by the control unit for controlling the way in which the clutches are engaged. In one example, the clutch-control-signal may be an electronic signal provided to a hydraulic fluid supply circuit for providing the one or more clutches with pressurised hydraulic fluid to engage the clutch to an extent that will provide the desired torque transfer.

Rather than immediately and fully engaging the one or more clutches of the agricultural baler, the method of the present disclosure can control the clutch engagement, and therefore the torque transferred by the clutch between the input shaft and the flywheel, on the basis of the input-power-data. As indicated above, the input-power-data is representative of the power available at the rotary input shaft. This will advantageously result in the flywheel being brought up to an operating speed in a more time and energy efficient way, and therefore an improved start-up of the baler. Also, the method of FIG. 3 can beneficially reduce the likelihood of the tractor engine stalling during start-up of the baler.

Figure 4:
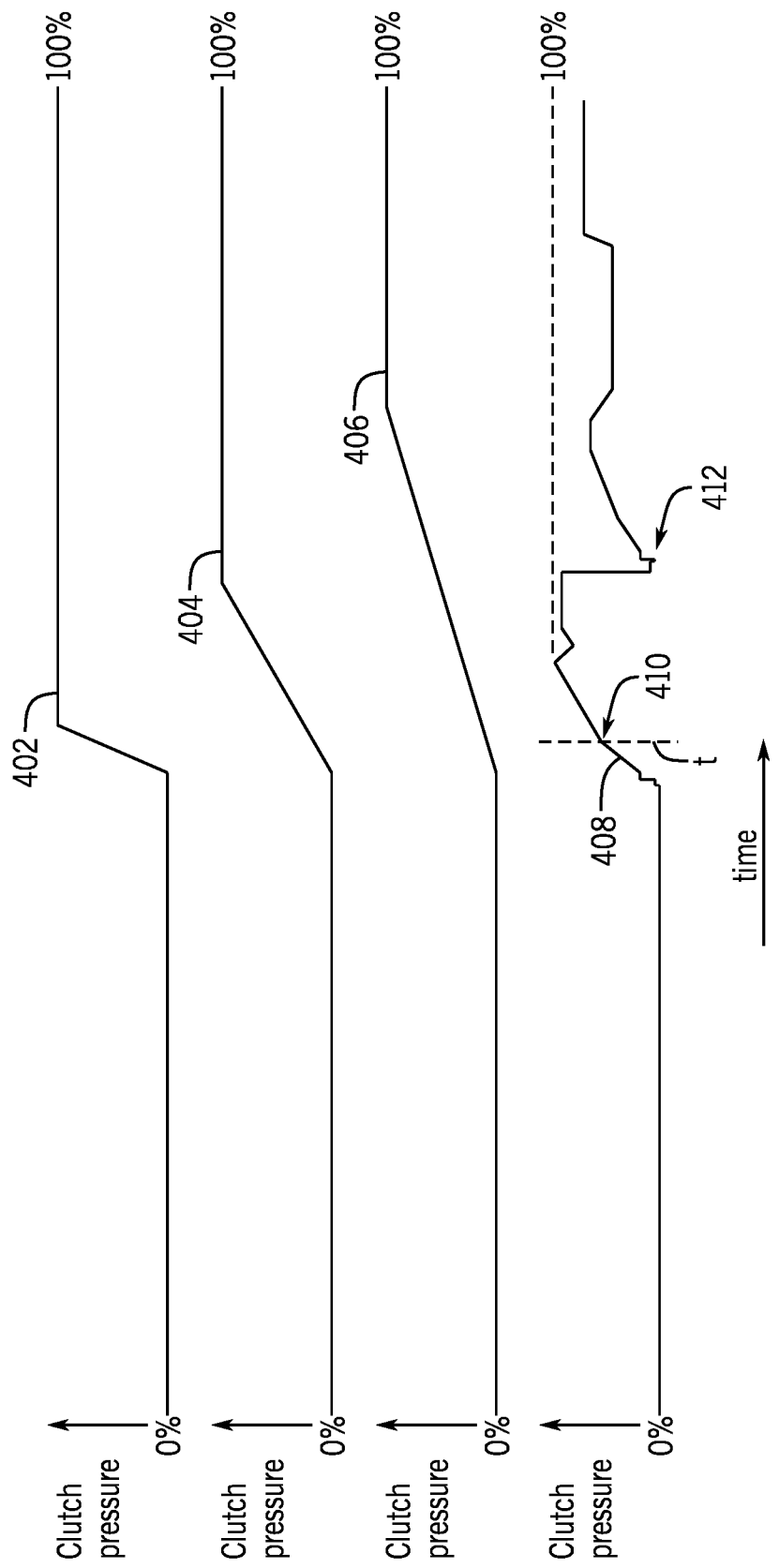
FIG. 4 shows four example clutch-control-signals that can be determined based on received input-power-data.

FIG. 4 shows four example clutch-control-signals 402, 404, 406, 408 that can be determined based on received input-power-data. Each of the clutch-control-signals 402, 404, 406, 408 has been scaled so that they are illustrated on a scale of 0% to 100% of clutch pressure/torque In one implementation, an operator of the baler can be presented with an interface for selecting the responsiveness of the tractor engine that they are using to provide power to the baler. For instance, the operator may be presented with three responsiveness options: (i) a highly responsive; (ii) medium responsiveness; and (iii) a low responsiveness. As will be discussed below, and as is known in the art, the engine type and many other things can affect the responsiveness of the engine. Predefined-input-power-data can then be sent to the control unit that is representative of the selected responsiveness.

If the operator selects the highly responsive option, then this selection causes predefined-input-power-data that is representative of a highly-responsive-engine to be sent to the control unit. The control unit can then determine and apply an appropriate target-control-profile as the clutch-control-signal for a highly responsive engine based on the received predefined-input-power-data. An example of such a clutch-control-signal is shown in the first plot of FIG. 4 with reference 402. It can be seen that the clutch pressure is increased relatively quickly. This is on the assumption that the clutch will be able to transfer torque from a highly responsive engine to the flywheel relatively quickly, and that the load provided by the flywheel will not cause the tractor engine any undue difficulties.

If the operator selects the medium responsive option, then this selection causes predefined-input-power-data that is representative of a medium-responsive-engine to be sent to the control unit. The control unit can then determine and apply an appropriate target-control-profile as the clutch-control-signal for a mid-responsiveness engine based on the received predefined-input-power-data. An example of such a clutch-control-signal is shown in the second plot of FIG. 4 with reference 404. Compared to the first plot 402 (for the highly-responsive engine) it can be seen that the clutch pressure in the second plot 404 (for the mid-responsiveness engine) is increased more slowly. This is on the assumption that the clutch will need to more slowly transfer torque from a medium responsiveness engine to the flywheel to avoid the load (provided by the flywheel) causing the tractor engine to stall.

The third plot 406 in FIG. 4 shows a corresponding clutch-control-signal for a low-responsiveness option, where the clutch engagement is slower still.

If the operator does not provide predefined-input-power-data that is indicative of a responsiveness of the tractor engine, before the start-up procedure is initiated, then the control unit may automatically select a default target-control-profile for gradually engaging the one or more clutches. The default target-control-profile may be a highly-responsive-control-profile. In this way, the control unit may set the predefined-input-power-data as representative of a highly-responsive tractor engine.

It will be appreciated that the amount of clutch pressure that achieves 100% clutch torque, as is shown in the first to third plots 402, 404, 406, may be different for tractor engines having different power levels. For example: 100% clutch torque for a high powered tractor may be 19 bar, 100% clutch pressure for a medium powered tractor may be 17 bar, and 100% clutch pressure for a low powered tractor may be 15 bar. The clutch-control-signals of the first to the third plots 402, 404, 406 illustrate a linear change from a low clutch pressure level to a high clutch pressure level.

As discussed above, the responsiveness of the engine is an important factor that affects how quickly the clutch can be engaged. Some newer engines can take longer to deliver power than some older engines, for fuel efficiency reasons. Therefore it can be possible that a newer tier4b 470 hp engine (an example of a high-power engine) requires a less steep clutch pressure curve than an older tier2 270 hp engine (an example of a low-power engine), for instance. That is, the rate at which an engine can deliver its rated power will depend on the responsiveness of the engine.

In some examples separate target-control-profiles can be available for each of a plurality of engine types, and for each of the different responsiveness options that are available to the operator. Optionally a single target-control-profile may be used for a plurality of combinations of different engine types and power levels. For instance, the target-control-profile 402 of the first plot can be used for a more responsive tier3 270 hp (low power) tractor engine. Similarly, the target-control-profile 404 of the second plot can be used for a less responsive tier4b 470 hp (high power) tractor engine.

The fourth plot 408 in FIG. 4 shows a more sophisticated target-control-profile that can be used as the clutch-control-signal, wherein the clutch pressure level does not transition linearly from the low level to the high level. That is, the target-control-profile may have a non-linearity. Also, the fourth plot 408 shows a clutch-control-signal for a clutch in a two-speed gearbox such as the gearbox that is described above with reference to FIG. 2.

In the fourth plot 408, at a time 't' after the clutch has been engaged, the rate of change of the clutch pressure changes from a first value (immediately before 't') to a second value (immediately after 't'). This transition is labelled as 410 in FIG. 4, and represents a non-linearity in the clutch-control-signal that is used to control the amount of torque transferred from the input shaft to the flywheel. In this example, the transition 410 occurs while the gearbox applies the same transmission ratio (that is, for the same gear in the gearbox). The specific details of the transition can be determined in a testing/configuration operation of the baler. In the present case it was found that the tractor engine could accommodate a relatively fast increase in clutch pressure initially (as represented by the steep slope in the clutch-signal before 't'), and then the rate of change of clutch pressure should be reduced after 't' to avoid the engine stalling. Such a clutch-signal 408 can advantageously enable the baler to be started (by getting the flywheel up to an operating speed) relatively quickly with a reduced likelihood of the tractor engine stalling.

The clutch-signal 408 of FIG. 4 also shows that the clutch can be disengaged and then re-engaged to apply a second transmission ratio, as generally indicated with reference 412 in FIG. 4.

According to one embodiment of the present disclosure, the likelihood of engine stalling can be reduced or avoided by way of selecting an appropriate target-control-profile on the basis of the predefined-input-power-data received. In this embodiment, the predefined-input-power-data may be indicative of the responsiveness of the engine driving the rotary input shaft, which may be provided by the operator or automatically retrieved by a control unit. On the basis of the predefined-input-power-data the control unit may be able to accurately select an appropriate target-control-profile that will match the available power output of the engine and thus avoid inadvertent stalling.

In some embodiments, an operator of the baler can also, or instead, be presented with an interface for selecting the power level of the tractor engine that they are using. For instance, the operator may be presented with three power level options: (i) a high-power tractor; (ii) a mid-power tractor; and (iii) a low-power tractor.

If the operator selects the high-power-tractor, then this selection causes predefined-input-power-data that is representative of a high-power tractor to be sent to the control unit. The control unit can then determine and apply an appropriate target-control-profile as the clutch-control-signal for a high-powered tractor based on the received predefined-input-power-data. The control unit can perform similar processing for a mid- and low-power tractor. In determining and applying the appropriate target-control-profile, the control unit may set a maximum-pressure-value based on the power level of the tractor. The maximum-pressure-value can determine the end point of the pressure plots that are shown in the first to third plots in FIG. 4 in particular. In this way, a high-power target-control-profile, having a maximum-pressure-value of 19 bar for example, may be predetermined to be suitable for engine with an output power of 380 HP or more. A low-power target-control-profile, having a maximum-pressure-value of 12 bar for example, may be predetermined to be suitable for engines with an output power between 270 HP and 319 HP. A mid-power target-control-profile, having a maximum-pressure-value of 15 bar for example, may be predetermined to be suitable for engines with an output power between 320 HP and 379 HP. Each of these power-related target-control-profiles will set the maximum-pressure-value of fluid pressure that will be applied to the clutch, such that it is suitable for the corresponding power rating of the tractor engine. Of course, there may be any number of target-control-profiles for different ranges of engine output powers and types.

Each of the target-control-profiles that are described with reference to FIG. 4 can be considered as one of a plurality of predetermined target-control-profiles.

Figure 5:
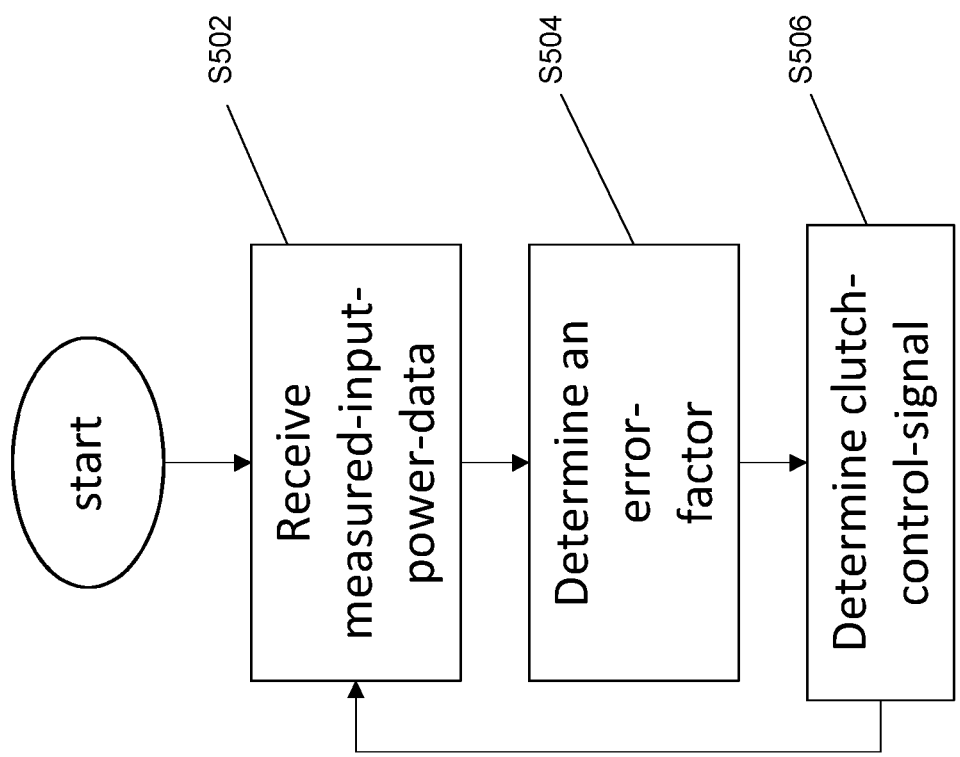
FIG. 5 shows a schematic flow chart of another method for controlling an agricultural baler according to an embodiment of the present disclosure.

FIG. 5 shows a schematic flow chart of another method for controlling an agricultural baler according to an embodiment of the present disclosure.

In a first step S502, the method involves receiving input-power-data, which in this example is measured-input-power-data. The measured-input-power-data represents measurements of one or more operating parameters of the baler and/or the tractor (or more generally, of the agricultural system, which may or may not include the tractor). For instance, the measured-input-power-data may represent one or more of: the rotary input shaft speed, the PTO shaft speed, and/or the tractor engine output power. Each of these measures can indicate an ability of the tractor engine to meet the load requirements of the flywheel, especially during start-up when accelerating the flywheel up to its operating speed can require a lot of energy from the tractor engine.

At step S504, the method involves determining an error-factor. The error-factor can represent an indicator that one or more of the measurements has dropped below an expected value. For instance, the error-factor can include a binary flag that is set if a measurement drops below a threshold value, because this can be an indicator that the tractor engine is at risk of stalling. Also, the error-factor can include an error-value that represents the difference between the measurement and a threshold value. Furthermore, the error-factor can include a binary flag that is set if a rate-of-change (optionally a negative rate-of-change) of the measurement exceeds a threshold value. Further still, the error-factor can include a derivative-value that represents the difference between the rate of change (derivative with respect to time) of the measurement and a threshold value. Each of these examples of an error-factor can be indicative of the tractor engine not having sufficient power to continue to power the flywheel at the current level of clutch engagement.

At step S506, the method includes determining the clutch-control-signal based on the error-factor. As will be discussed below, this can involve determining a correction-factor for applying an offset to a current level of the clutch-control-signal to decrease the rate at which torque is transferred to the flywheel via the one or more clutches. This can either maintain a current clutch pressure (instead of increasing it) or can reduce the clutch pressure. This example enables the control unit to dynamically control the clutch such that the baler is started up (and the flywheel is brought up to speed) in a quick and efficient manner, with a reduced risk of the tractor engine stalling. Advantageously, the control unit may not require operator input because it can start off with a clutch-control-signal that assumes that a highly-responsive tractor engine is available, and only reduce the speed with which the clutch is engaged (by reducing the slope of the clutch-control-signal) if the measured operating parameters indicate that the tractor engine is at risk of stalling.

Figure 6:
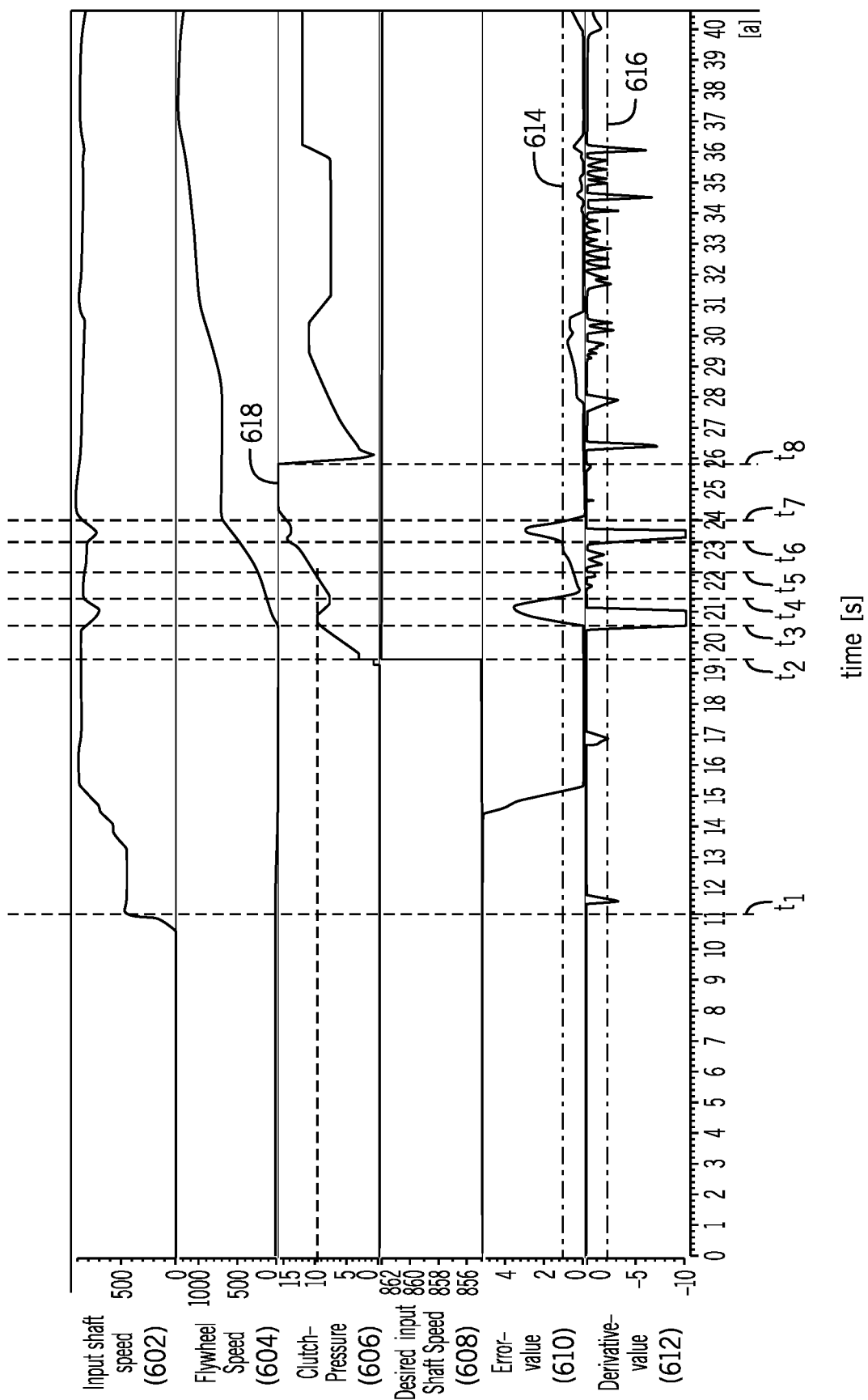
FIG. 6 shows various baler parameters during an exemplary baler start-up process according to an embodiment of the present disclosure.

With reference to FIG. 6, there are shown the values of various baler parameters during an exemplary baler start-up process according to an embodiment of the present disclosure. The diagram of FIG. 4 shows the following parameters:

the input shaft speed 602 of the input shaft 27 of the transmission 38 that is shown in FIG. 2, which corresponds to the speed of a PTO shaft transferring input-power from the tractor 11 to the baler 10.

the flywheel speed 604, which corresponds to the speed of the flywheel shaft 29 of the gearbox that is shown in FIG. 2.

the clutch-pressure 606, which is controlled by the clutch-control-signal, which affects the amount of torque that can be transferred from the input shaft 602 to the flywheel 604 via the clutch.

the desired input shaft speed 608, which can be considered as target speed for the input shaft. The desired input shaft speed 608 can be predetermined setpoint of the PTO speed, or can be set as the input shaft speed before the engagement of the clutch. If the input shaft speed 602 drops below the desired input shaft speed 608, then this can be indicative of the tractor engine not having sufficient available power to continue to accelerate the clutch as the present level of clutch engagement.

an error-value 610 that, while the clutch is being engaged, represents the difference between the desired input shaft speed 608 and the input shaft speed 602.

a derivative-value 612 that, while the clutch is being engaged, represents the rate of change with respect to time of the input shaft speed 602.

Turning to the input shaft speed 602, the engine of the tractor is started at a time $t_1$, which relates to around 11 seconds in FIG. 4. In the combination of the tractor and agricultural baler used for the measurements shown in FIG. 4, the tractor engine provides PTO shaft speeds, and therefore, baler input shaft speeds 602 of around 500 rpm when the engine is first started, and no load is connected to the input shaft. It will be appreciated that this input shaft speed is dependent on the engine used and shall not be limiting to the scope of the present disclosure.

Before the start-up procedure of the baler is initiated via the method of the present disclosure, the control unit will prompt the operator to increase the input shaft speed 602 (and hence the PTO shaft speed) to a level that is suitable for efficient operation of the baler. In this example, the target input shaft speed is 862 rpm. Alternatively, the control unit may automatically increase the output speed of the tractor engine so as to increase the input shaft speed 602 without the operator being required to increase the speed manually. This automatic control of the tractor engine output speed may be in response to an operator providing input for initiating the baler start-up procedure.

Once the input shaft speed 602 has reached the desired value, the start-up process can be initiated. In some examples, the control unit may monitor the input shaft speed 602 once it is up to speed, and before the clutch is engaged, to determine the value of the desired input shaft speed 608 that will be used during the clutch engagement operation. For example, if the input shaft speed has been successfully brought up to 862 rpm, then this value will be used for the desired input shaft speed 608. If, however, it was only possible to bring the input shaft speed up to 850 rpm, then this value will be used as the desired input shaft speed 608. This can enable any unexpected variance in the "normal" input shaft speed to be accommodated by the algorithm. Alternatively, a predetermined fixed value can be used as the desired input shaft speed 608.

The input shaft speed 602 is an example of measured-input-power-data, and it is data that is indicative of whether or not sufficient drive power is available at the rotary input shaft. The control unit can process the input shaft speed 602 to determine the clutch-control signal (for setting the clutch-pressure 606). Furthermore, the control unit can determine one or both of (i) the error-value 610; and (ii) the derivative-value 612, based on the input shaft speed 602. The control unit can then determine the clutch-control signal based on one or both of (i) the error-value 610; and (ii) the derivative-value 612. Further details are provided below.

In the embodiment of FIG. 4, the method is initiated at a time $t_2$. The starting time $t_2$ may be automatically chosen by the control unit at a predetermined time after the input shaft speed 602 was brought up to its full operating speed (about 862 rpm in this example), or once the input shaft speed 602 has remained above a set speed-threshold (such as 850 rpm) for a predetermined period of time.

At time $t_2$, the control unit applies a clutch-control-signal such that the clutch pressure 606 starts to increase with an initial slope/gradient. This initial-gradient may be a predetermined gradient, and may be a maximum-gradient in an attempt to start up the baler as quickly as possible. In one example, the maximum-gradient can correspond to a 7 bar/s increase in the clutch-pressure 606.

As shown in FIG. 6, increasing the clutch-pressure 606 at the initial-gradient is achievable until a time $t_3$, at which time the input shaft speed 602 has started to drop. This indicates that the tractor engine is unable to provide sufficient torque to continue to accelerate the flywheel at the current rate of clutch engagement. As can be seen from FIG. 6, this is the instant in time that the flywheel speed 604 starts to increase and therefore the load on the tractor engine has suddenly increased significantly.

While the clutch is being engaged, the control unit is subtracting the input shaft speed 602 from the desired input shaft speed 608 in order to calculate the error-value 610. Also, the control unit is calculating the rate of change of the input shaft speed 602 in order to determine the derivative-value.

In this example the control unit compares the error-value 610 with an error-value-threshold 614, and if the error-value 610 exceeds the error-value-threshold 614, then the control-unit determines a clutch-control-signal that has a reduced rate of change. This can be seen from FIG. 4 after $t_3$, where the clutch-pressure 606 initially flattens out from its initial-gradient and then has a negative gradient.

In this example, the control unit also compares the derivative-value 612 with a derivative-value-threshold 616, and if the derivative-value 612 falls below the derivative-value-threshold 616, then the control-unit determines a clutch-control-signal that has a reduced rate of change. The deceleration of the PTO shaft, as represented by the derivative-value 612, is directly proportional to the shortfall in the amount of power that is available for driving the flywheel.

In this way, the control unit can alter the clutch-control-signal (and hence the clutch-pressure 606) so as to reduce the amount of torque transferred from the input shaft to the flywheel.

FIG. 6 illustrates a sophisticated control algorithm in that it can take into account both the error-value 610 and the derivative-value 612 when determining the clutch-control-signal. Using the derivative-value 612 can advantageously enable any sharp changes in the input shaft speed 602 to be identified quickly such that remedial action can be taken by adjusting the slope of the clutch-control-signal. Using the error-value 610 can advantageously enable any slower changes in the input shaft speed 602 to be identified such that remedial action can be taken by adjusting the slope of the clutch-control-signal. Therefore, particularly good control can be achieved by determining the clutch-control-signal on the basis of both the error-value 610 and the derivative-value 612. Nonetheless, in other embodiments, the control unit can determine the clutch-control-signal on the basis of only one of the error-value 610 and the derivative-value 612, or on the basis of the input shaft speed 602 directly (such as by comparing the input shaft speed 602 with a threshold).

At time $t_4$, the error-value 610 has dropped below the error-value-threshold 614 and the derivative-value 612 has dropped below the derivative-threshold-value 612. At this point (e.g. at the time $t_4$), the control unit may determine the clutch-control-signal such that the clutch pressure 606 starts to increase with a predetermined slope/gradient. This gradient may be the initial-gradient, or a reduced-gradient (i.e. one that is less than the initial-gradient. It can be advantageous to apply a reduced-gradient on the assumption that the initial-gradient is unsustainable for the size of the tractor engine that is being used to power the baler. The reduced-gradient may be predetermined, or may be set by the control unit based on one or more of the input shaft speed 602, the error-value 610 and the derivative-value 612 (or any other measured-input-power-data, or derivative thereof). The clutch-pressure 606 profile shown in FIG. 4, thus, starts to increase again at the time $t_4$ since the input shaft speed 602 is back up to (or near enough to) its desired input shaft speed of 862 rpm. Also, the flywheel speed 604 has moved away from zero.

In this way the reduction of the clutch pressure, and the reduction in torque transfer from the input shaft, can be temporary, e.g. for as long as the error-value 610 remains above the error-value-threshold 614 and/or the derivative-value 612 remains below the derivative-value-threshold 616. To this end, the control unit may decrease the clutch-pressure 606 temporarily, shortly after the error-value has exceeded the error-value-threshold 614 and or the derivative-value 612 falls below the derivative-value-threshold 616. The decrease in clutch-pressure 606 can be temporary in order to enable the input shaft speed 602 (and hence also the tractor engine) to recover with a reduced load due to increased slip in the clutch. Once the input shaft speed 602 has recovered, the clutch-pressure can potentially start to be increased at a faster rate again without stalling the tractor engine.

At a time $t_5$, the clutch-pressure 606 yet again reaches 10 bar, meaning an amount of torque transferred by the clutch is identical to the torque transferred at the time $t_3$. However, at the time $t_5$, i.e. about 1 second later than when the clutch-pressure 606 reached 10 bar for the first time at time $t_3$, the speed of the flywheel 604 has increased and a rate of change of the clutch-pressure 606 is lower than it was previously. This is an example of a relatively slowly responsive engine because it needed one second to ramp up the injection in order to deliver the required torque at that speed of the PTO. In the example of FIG. 4, the start-up with the initial-gradient in the clutch-pressure 606 was too fast for the engine T3, such that at time $t_3$ the control unit automatically delayed full engagement of the one or more clutches by decreasing the clutch-pressure temporarily until time $t_5$.

As discussed above, the amount of reduction in clutch-pressure 606, and therefore the amount of decrease in torque transferred to the flywheel, may be based on the error-value. In one example, the control unit may reduce the clutch-pressure 606 by an amount that depends on the size of the error-value 610. In other words, a correction-factor (which represents a decrease in the amount of torque transferred to the flywheel) may be related to (optionally directly proportional to) the error-value 610. Similarly, the control unit may set the correction-factor for the clutch-pressure 606 based on the size of the derivative-value 612. Alternatively, the control unit may apply a correction-factor that has a predetermined, fixed, value to reduce the clutch-pressure 606 in response to the error-value 610 exceeding the error-value-threshold and/or the derivative-value 612 dropping below the derivative-value-threshold.

At time $t_6$ the error-value 610 exceeds the error-value-threshold 614 X for a second time, and the derivative-value 612 also drops below the derivative-value-threshold 616. The control unit again reacts by decreasing the slope of the clutch-pressure 606 in order to delay full engagement of the one or more clutches and thereby provide more time for the tractor engine to reach its optimal working condition. Similar to the above, the slope of the clutch-pressure 606 may be reduced until a time $t_7$, at which point the error-value 610 has dropped below the error-value-threshold 614. After t7, the control unit may determine the clutch-control-signal such that the clutch pressure 606 starts to increase with a predetermined slope/gradient. This gradient may be the same as an earlier used gradient, or may be a further-reduced-gradient (i.e. one that is less than the reduced-gradient).

The one or more clutches are fully engaged in this example when the clutch-pressure 606 has reached 15 bar. Also, the tractor engine is able to maintain the input shaft speed at a sufficiently high value (such that the error-value 610 does not exceed the error-value-threshold 614). At this point, the clutch-pressure 606 reaches a plateau 618 during which the clutch-pressure is maintained at 15 bar, i.e. the one or more clutches are fully engaged, for a predetermined period of time, such as the time required for the plunger to reach its fully retracted position.

The clutch-control-signal that controls the clutch-pressure 606 as shown in FIG. 6 may be applied by the control unit during start-up of the agricultural baler, e.g. when the transmission is set to its first selectable transmission ratio G1 by means of the first clutch 49. Once the first clutch 49 is fully engaged, a gear-change may be initiated at time $t_8$, at which point the clutch-pressure 606 of the first clutch 49 is significantly reduced to disengage the first clutch 49 and select the second transmission ratio G2 by gradually pressurising the second clutch 54.

The embodiment described above includes the use of a dynamically defined clutch-control-signal based on measured-input-power-data (the input shaft speed 602). In the example of FIG. 6, the available power output of the engine was too low for the initial-gradient, such that the gradient of the clutch-pressure profile 606 was reduced to avoid stalling. In one embodiment, the control unit may be configured to store a transcript of the clutch-control-signal (that results in the clutch-pressure 606 shown in FIG. 6) as prior-clutch-control-data for future use. The prior-clutch-control-data may be used directly as a new target-control-profile for future baler start-up procedures (such as the ones shown in FIG. 4).

In another embodiment, before $t_2$, when the start-up procedure is initiated, the control unit may prompt the user to enter predefined-input-power-data indicative of the responsiveness of the tractor engine that is driving the rotary input shaft. Alternatively, the control unit may be configured to automatically determine the predefined-input-power-data (e.g. the engine performance) before the start-up procedure is initiated. As will be described in more detail below, this predefined-input-power-data that is indicative of the responsiveness of the tractor engine may be used by the control unit to determine a suitable target-control-profile for controlling the engagement of the one or more clutches. This is in contrast to the embodiment of FIG. 6, in which the clutch-pressure is initially increased at a gradient that is chosen irrespective of the particular output performance of the corresponding tractor engine.

Generally, it will be understood that the control unit may choose a faster start-up procedure, i.e. determine clutch-control-signals that fully engage the one or more clutches within shorter periods of time (e.g. profiles 402, 412 of FIG. 4), if the predefined-input-power-data indicates that the tractor engine has a highly responsive power output. Similarly, the control unit may choose a slower start-up procedure if the predefined-input-power-data indicates that the tractor has a less responsive engine (e.g. profile 406 of FIG. 4).

The control unit may have access to a plurality of predetermined target-control-profiles. Examples of target-clutch-control-profiles are illustrated in the plots 402, 404, 406, 412 depicted in FIG. 4. Each of the plurality of predetermined target-control-profiles (e.g. 402, 404, 406, 412) available to the control unit may be suitable for a range of tractor engine responsiveness levels. Generally, the target-control-profiles for a highly responsive tractor engine (e.g. plots 402 and 412) will be applicable to increase the amount of torque transferred from the input shaft to the flywheel quicker than target-control-profiles for a less responsive tractor engine (e.g. plots 404, 406).

As explained above, if the one or more clutches are engaged too quickly (e.g. the amount of torque transferred from the input shaft to the flywheel is ramped up too quickly for a tractor engine that does not have the available torque), then engine stalling may be the result. In the example above, this could be the case if the highly-responsive target-control-profile 412 was applied to a tractor engine with a low responsiveness. This may, for example, occur if a target-control-profile that is suitable for a highly responsive tractor engine is used for a less responsive tractor engine.

In one embodiment, the control-unit may be configured to receive both predefined-input-power-data and measured-input-power-data. In this embodiment, even if the target-control-profile, which was chosen on the basis of the predefined-input-power-data, is too steep (i.e. the clutch pressure is increased too quickly for the responsiveness of the engine), the control unit is still able to adjust the clutch-control-signal on the basis of the measured-power-input-data to avoid stalling. In other words, in this embodiment, the control-unit will employ the target-control-profile as the clutch-control-signal for as long as no significant decrease in the speed of the input shaft is detected. Should an unacceptable decrease in the speed of the input shaft be detected on the basis of the measured-input-power-data, the control unit will change (e.g. temporarily decrease) the gradient of the clutch-pressure to deviate from the chosen target-control-profile to avoid stalling. Then, when the input shaft speed has returned to an acceptable value, the control-unit will employ the target-control-profile as the clutch-control-signal again.

In yet another embodiment, prior-clutch-control-data (explained above) may be used to determine the predefined-input-power-data provided to the control-unit. This may be an alternative to an operator manually providing the engine responsiveness during the baler start-up. The control-unit may be configured to check if prior-clutch-control-data is available before the baler start-up is initiated. If prior-clutch-control-data is available, the control unit may be configured to use the prior-clutch-control-data automatically for determination of the clutch-control-signal. Alternatively, the control unit may be configured to prompt the operator to determine whether the prior-clutch-control-data should be used by the control unit. The operator may then provide a trigger-input to confirm that the control unit should make use of the prior-clutch-control-data. In one example, the trigger-input may be provided via a touch screen interface. The operator may choose not to use the prior-clutch-control-data, for example, if a new tractor is connected to the baler for the first time and the prior-clutch-control-data was recorded with a different tractor.

On the basis of the prior-clutch-control-data, the control unit may be able to accurately determine the responsiveness of the engine (i.e. determine predefined-power-input-data) and select a suitable target-control-profile from a plurality of predetermined target-control-profiles available (e.g. one of the clutch-control-signals 402, 404, 406, 412 shown in FIG. 4). In one example, after a first baler start-up, the dynamically determined clutch-pressure profile 606 of FIG. 6 may be provided to the control unit as prior-clutch-control-data and may be used by the control unit to determine the responsiveness of the tractor engine. After determination of the responsiveness of the engine on the basis of the prior-clutch-control-data, the control unit may start the baler on the basis of a suitable target-control-profile in the future.

Examples disclosed herein can be particularly beneficial when the control unit associated with a baler does not know the available power on the tractor. Therefore, it can be challenging for the baler to use that unknown power source to start-up in an efficient way. One or more of the examples disclosed herein can avoid a need to use a fixed load that is suitable for all tractor engines (including less responsive ones). This can be advantageous because the start-up times for the least responsive engines will be much too slow for the more responsive engines. Similarly, if a fixed load value for a highly responsive engine were used for less responsive engine, then the tractor engine would stall. Therefore, examples disclosed herein can beneficially provide an adaptive load control, for adjusting the amount of load that is put on the tractor engine without stalling it, and without necessarily knowing what the tractor engine can deliver in advance. This can all be alongside providing an efficient start-up in terms of starting the machine sufficiently quickly. The above description is one example of controlling the amount of torque transferred from the input shaft to the flywheel via a clutch on the basis of input-power-data. In the above example, hydraulically actuated friction clutches are used to transfer torque between the input shaft and the flywheel. However, it will be understood that any other form of clutch may be applicable, requiring corresponding clutch-control-signals for adjustment of the torque transfer. Furthermore, in the example of FIG. 6, a single clutch is used to transfer the torque from the input shaft to the flywheel for each selected transmission ratio G1, G2. However, it will be understood that it is equivalently possible to employ a variety of clutches working in parallel. The gradient of the clutch-pressure of the example illustrated in FIG. 6 is adjusted, i.e. decreased, twice during the start-up process. However, this should not be considered as limiting. In some examples, the clutch-pressure 606 may not need to be adjusted at all, particularly if the power output of the tractor engine exceeds the power output on which the initial-gradient of the clutch-pressure is based.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An agricultural system comprising:
   an agricultural baler comprising:
   a baler driveline;
   a rotatable flywheel; and
   a rotary input shaft connected by way of the baler driveline to the rotatable flywheel, the driveline including one or more clutches for controllably transferring rotary drive between the input shaft and the flywheel; and
   a control unit that:
   receives input-power-data indicative of a drive power available at the rotary input shaft, wherein the input-power-data comprises measured-input-power-data that represents measurements of one or more operating parameters of the agricultural system or an associated tractor;

determines a clutch-control-signal for controlling an amount of torque transferred from the input shaft to the flywheel by the one or more clutches, based on the input-power-data;

determines an error-factor that is an indicator that one or more of the measurements has dropped below an expected value;

determines a clutch-control-signal for decreasing a rate at which torque is transferred to the flywheel by the one or more clutches based on the error-factor; and controls the one or more clutches based on the clutch-control-signals to set a pressure applied to engage friction surfaces of the one or more clutches.

2. The agricultural system of claim 1, wherein the control unit further determines a clutch-control-signal for gradual increase of the amount of torque transferred to the flywheel.

3. The agricultural system of claim 1, wherein:

the measured-input-power-data represents a measurement of a rotational speed of the rotary input shaft, and wherein the control unit further:

determines an error-value that is an indicator that rotational speed of the rotary input shaft has exceeded an error-value-threshold; and determines the clutch-control-signal based on the error-value in order to decrease the rate at which torque is transferred to the flywheel by the one or more clutches.

4. The agricultural system of claim 3, wherein the control unit further determines a clutch-control-signal for decreasing the rate at which of torque is transferred to the flywheel by the one or more clutches until the error-value has dropped below the error-value threshold.

5. The agricultural system of claim 1, wherein:

the measured-input-power-data represents a measurement of a rotational speed of the rotary input shaft, and wherein the control unit further:

determines a derivative-value that is an indicator that a rate of change of a rotational speed of the rotary input shaft with respect to time has exceeded a derivative-value-threshold; and determines a clutch-control-signal based on the derivative-value in order to decrease the rate at which of torque is transferred to the flywheel via the one or more clutches.

6. The agricultural system of claim 5, wherein the control unit further determines a clutch-control-signal for decreasing the rate at which of torque is transferred to the flywheel by the one or more clutches until the derivative-value has dropped below the derivative-value-threshold.

7. The agricultural system of claim 1, and wherein:

the input-power-data comprises predefined-input-power-data; and the control unit further determines a clutch-control-signal as one of a plurality of predetermined target-control-profiles based on the predefined-input-power-data, wherein each of the plurality of predetermined target-control-profiles is configured to increase an amount of torque transferred to the flywheel at a different rate.

8. The agricultural system of claim 7, wherein the plurality of predetermined target-control-profiles include a high-responsive target-control-profile and a low-responsive target-control-profile, and wherein the high-responsive target-control-profile is configured to increase the amount of torque transferred to the flywheel faster than the low-responsive target-control-profile.

9. The agricultural system of claim 7, wherein the predefined-input-power-data is indicative of a responsiveness of an engine driving the rotary input shaft, and wherein the control unit further selects one of the plurality of predetermined target-control-profiles based on the responsiveness of the engine.

10. An agricultural system comprising:

an agricultural baler comprising:
a baler driveline;
a rotatable flywheel; and
a rotary input shaft connected by way of the baler driveline to the rotatable flywheel, the driveline including one or more clutches for controllably transferring rotary drive between the input shaft and the flywheel; and a control unit that:
receives input-power-data indicative of a drive power available at the rotary input shaft;
determines a clutch-control-signal for controlling an amount of torque transferred from the input shaft to the flywheel by the one or more clutches, based on the input-power-data; and
controls the one or more clutches based on the clutch-control-signal to set a pressure applied to engage friction surfaces of the one or more clutches,
wherein the input-power-data comprises predefined-input-power-data, wherein the predefined-input-power-data is provided by an operator, and wherein the control unit is configured to select a high-responsive target-control-profile if the operator does not provide the predefined input-power-data before a rotational speed of the rotary input shaft exceeds a set speed-threshold.

11. The agricultural system of claim 1, wherein the control unit further stores a transcript of the clutch-control-signal as prior-clutch-control-data for future use.

12. The agricultural system of claim 1, wherein the baler driveline further includes a transmission including driveline components defining at least first and second selectable transmission ratios between the input shaft and the flywheel, the one or more clutches being capable of selectively engaging the first or second transmission ratios, and wherein the control unit further determines a clutch-control-signal applicable to selectively engage driveline components defining the first transmission ratio during start-up of the agricultural baler.

13. The agricultural system of claim 12, wherein the control unit determines a clutch-control-signal applicable to selectively engage driveline components defining the second transmission ratio, if the one or more clutches are fully engaged, when the transmission operates at the first transmission ratio, and a rotational speed of the rotary input shaft remains above a set speed-threshold for a predetermined amount of time.

14. The agricultural system of claim 1, wherein the one or more clutches are friction clutches.

15. A computer-implemented method for controlling an agricultural baler, the baler comprising a baler driveline; a rotatable flywheel; and a rotary input shaft connected by way of the baler driveline to the rotatable flywheel, the driveline including one or more clutches for controllably transferring rotary drive between the input shaft and the flywheel, wherein the method comprises:
- receiving input-power-data indicative of a drive power available at the rotary input shaft, wherein the input-power-data comprises measured-input-power-data that represents measurements of one or more operating parameters of the agricultural system or an associated tractor;
- determining a clutch-control-signal for controlling an amount of torque transferred from the input shaft to the flywheel by the one or more clutches, based on the input-power-data;
- determining an error-factor that is an indicator that one or more of the measurements has dropped below an expected value;
- determining a clutch-control-signal for decreasing a rate at which torque is transferred to the flywheel by the one or more clutches based on the error-factor; and
- controlling the one or more clutches based on the clutch-control-signals to set a pressure applied to engage friction surfaces of the one or more clutches.

* * * * *